United States Patent [19]

Jones

[11] 4,283,521
[45] Aug. 11, 1981

[54] CURABLE AROMATIC EPOXY-POLYIMIDE AND CYCLOALIPHATIC EPOXY-POLYIMIDE COMPOSITIONS

[75] Inventor: Robert J. Jones, Hermosa Beach, Calif.

[73] Assignee: TRW Inc., Redondo Beach, Calif.

[21] Appl. No.: 12,097

[22] Filed: Feb. 14, 1979

[51] Int. Cl.³ .................. C08G 73/10; C08G 59/40
[52] U.S. Cl. .................................. 528/117; 428/413; 528/99; 528/100; 528/101; 528/109; 528/120; 528/322; 528/321; 525/422; 525/397
[58] Field of Search ............. 528/322, 117, 120, 109; 525/422, 397; 260/830 P, 837 R

[56] References Cited

U.S. PATENT DOCUMENTS

| | | | |
|---|---|---|---|
| 3,637,901 | 1/1972 | Bargain et al. | 528/322 |
| 3,763,087 | 10/1973 | Holub et al. | 260/837 R |
| 3,839,493 | 10/1974 | Balme et al. | 260/830 P |
| 3,875,113 | 4/1975 | Lefebvre et al. | 528/117 |
| 3,978,152 | 8/1976 | Gruffaz et al. | 260/830 P |

*Primary Examiner*—Harold D. Anderson
*Attorney, Agent, or Firm*—Donald R. Nyhagen; John J. Connors

[57] ABSTRACT

A prepolymer is comprised of the reaction product of at least one aliphatic bismaleimide, at least one aromatic amine and at least one aromatic bismaleimide in combination with an aromatic and/or a cycloaliphatic epoxy resin providing at least two functional epoxy groups to provide a low temperature curable composition. The cured products are strongly adherent to a variety of substrates.

35 Claims, No Drawings

CURABLE AROMATIC EPOXY-POLYIMIDE AND CYCLOALIPHATIC EPOXY-POLYIMIDE COMPOSITIONS

The Government has rights in this invention pursuant to Contract (or Grant) No. F 33615-77-C-5134, awarded by the Department of the Air Force.

BACKGROUND OF THE INVENTION

Polyimides have exhibited good thermo-oxidative stability in temperature ranges up to 300° to 400° C. Thus, in applications where elevated temperatures and corrosive conditions exist, polyimides have been suggested for extensive application. Early polyimides exhibited a low percentage of elongation to break and utility was limited.

U.S. Pat. No. 3,812,082 teaches a compliant or highly flexible polyimide produced from a condensation reaction of a dianhydride and a diamine or diisocyanate. These polyimides exhibit an elongation to break of up to 300 percent, and a set at break of 25 percent or less. Thus, where a high performance sealing material is required and it can be cast, such polyimides are very suitable.

A significant advance in a practical route to flexible polyimides is taught in U.S. Pat. No. 3,951,902. In this addition-type poly(Diels-Alder) approach, a melt polymerization reaction yields polymers acceptable for use at temperatures up to 288° C. The polyimides processed by this melt process possess properties equivalent to the solution route employed in U.S. Pat. No. 3,812,082. Thus, a melt process is available to provide flexible polyimides which possess a high elongation to break and can be melt extruded or cast into a variety of products including seals, sealants, adhesives and coatings. The availability of melt and hot melt product fabrication processes means substantial cost reduction and significant lessening of human hazards and environmental pollution over polyimides produced and processed by conventional solution methods.

U.S. Pat. No. 3,652,511 teaches a water-dispersible polyimide coating formed by reacting maleic anhydride with an aliphatic diamine in solution. The polyimide product can be formed into a hard and solvent resistant film. Elastomeric or high recoverable elongation characteristics are not inherent to the solution-produced polyimide itself and are achieved only by a copolymer reaction such as reacting a sulfhydryl-terminated polymer, such as nitrile rubber, with the maleic unsaturation in the bismaleimide or the acidic side chain. This approach significantly limits or excludes their utility in terms of applications where use in seal, sealant adhesive and coating use is required at temperatures of 120° C. or greater. Also, such resins have pendant carboxyl groups which result in water solubility. This diminishes their utility for general engineering applications due to possible unfavorable side reactions in high temperature use environments.

Similarly, U.S. Pat. No. 2,818,405 teaches elastomeric polyimides formed by the equal molar reaction of bismaleimides and free organic diamines. The organic diamines employed in this invention are hydrocarbon or halogenated hydrocarbon segments which restrict temperature performance to 93° C. or below. Also, the technology disclosed necessitates the use of organic tri- or tetraamines to accomplish cure of the linear imide resin initially produced. Use of the technology described therein severely limits achievement of a broad range of polymer mechanical properties because of the requirements to use 1:1 molar reactant stoichiometry.

In U.S. Pat. No. 4,116,937 assigned to the same assignee of this invention and incorporated herein by reference, there is described a flexible polyimide precursor produced by the Michael addition reaction of an aromatic diamine with an aromatic maleimide and a maleimide terminated polyaliphatic ether by a melt process and a cross-linked final product produced by a cure reaction. The addition reaction which forms the maleimide terminated precursor occurs in the melt at temperatures ranging from 100° to 150° C. Subsequently, when the temperature is raised to between 160° C. and 200° C., the precursor cures by a crosslinking reaction requiring no additional additives or catalysts.

There is a need in the art for polyimide compositions which can be readily cured at low temperatures such as from room temperature to about 120° F.

It has been determined that an aliphatic bismaleimide alone or modified with an aromatic bismaleimide and/or an aromatic diamine can be made to cure in the presence of a crosslinking agent having at least two vinyl groups and an active free radical catalyst at a temperature of 65° C. or less. A trismaleimide and an acid catalyst can be used in place of the crosslinking agent and free radical catalyst. Careful control, however, is required over proportions of reactants to achieve a product of acceptable properties.

Since the ingredients which form a curable system are often formulated just before application to a substrate and often by unskilled workers, it would be desirable to have a low temperature curable system which is less sensitive to deviations in proportions of ingredients. It is also desirable to provide a system where equal parts by weight or volume can be combined to achieve cure such that non-quantitative judgements can be made in metering reactants with assurance that a useful product will be formed when cure is perfected.

SUMMARY OF THE INVENTION

According to the present invention, there are provided low temperature curable compositions comprising at least one polyimide prepolymer which is the thermal reaction product of at least one aliphatic bismaleimide of the formula:

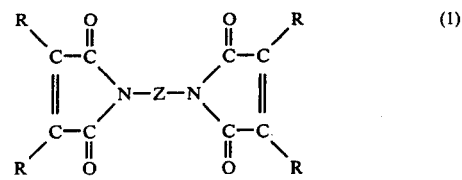

wherein Z is a polyaliphatic ether preferably a polyaliphatic ether in which the aliphatic groups independently contain from 1 to about 6 carbon atoms and preferably having a molecular weight in the range of about 300 to about 10,000, and each R is independently hydrogen, an aliphatic group containing 1 or 2 carbon atoms, a benzenoid radical, or a halogen; with at least one aromatic polyamine and at least one aromatic bismaleimide of the formula:

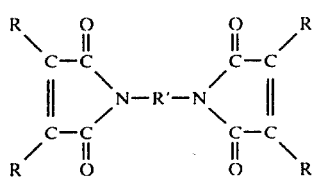 (2)

wherein each R is independently selected from the group consisting of hydrogen, an aliphatic group containing 1 or 2 carbon atoms, a benzenoid radical, and a halogen and wherein R' is a bifunctional benzenoid radical selected from the group consisting of:

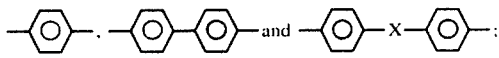

wherein X is selected from the group consisting of $-O-$, $-S-$, $-SO_2-$, $-CH_2-$, $C_2H_4-$, $-CO-$, $-C_3H_6-$, and

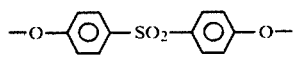

and at least one epoxy resin selected from the group consisting of:

(i) aromatic epoxy resins of the formula:

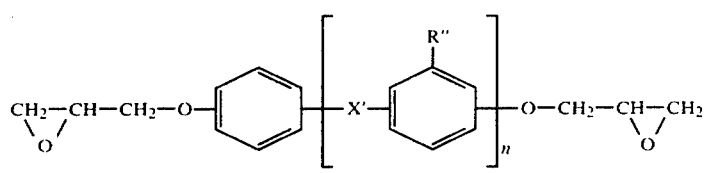 (3)

wherein n has an average value of from 0 to about 6; each X' is independently selected from the group consisting of

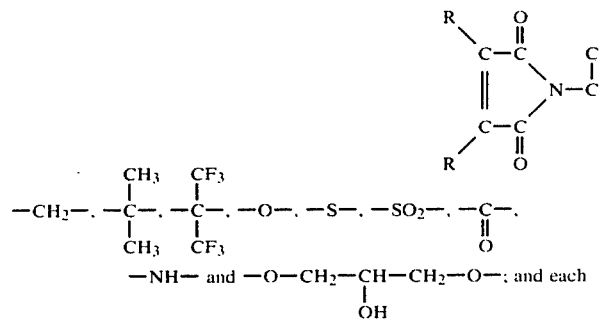

—NH— and —O—CH$_2$—CH(OH)—CH$_2$—O—; and each

R" is independently selected from the group consisting of —H, and

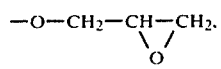

(ii) a cycloaliphatic epoxy resin of the formula:

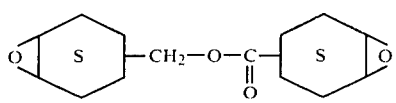 (4)

and mixtures thereof.

The polyimide prepolymers provided when combined with the epoxy resins will cure at temperatures from ambient to about 120° F. or more to end products displaying strong adhesion to substrates. Cure may be accomplished with an accelerator, however, an accelerator is not required.

As indicated, one or more of the above-identified polyimides and one or more of the above-identified epoxy resins may be used in formulating a curable composition. Aliphatic epoxy resins may be combined with the aromatic and/or cycloaliphatic epoxy resins to modify flexibility. The ingredients can be cured over a wide range of formulations. The preferred range is from about 40 to about 95 percent by weight polyimide prepolymer based on the total weight of polyimide prepolymer(s) and epoxy resin(s) present, more preferably from about 70 to about 90 percent by weight of the polyimide prepolymers based on the total weight of polyimide prepolymer(s) and epoxy resin(s) present.

The cured polyimide-epoxy compositions are suitable for adhesive and coating applications requiring high adhesion to various surfaces such as metallic and polymer coated surfaces. They offer excellent resistance to hydrocarbon, aromatic, cycloaliphatic and halogenated fuels, hydraulic fluids, and solvents. The compositions are attractive for field repair of aircraft and missiles.

The preferred aliphatic bismaleimides are those having the formula:

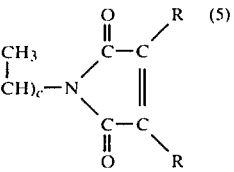 (5)

wherein the sum of a and c is about 3.5 and b is from 13.5 to about 45.5, preferably 20.5, and R is as defined above.

The aromatic polyamines presently contemplated for reaction with the aliphatic and aromatic bismaleimides to form the prepolymer are compounds of the general formula:

$NH_2-R'-NH_2$ (6)

wherein R' is as defined above and aromatic polyamines having the general formula:

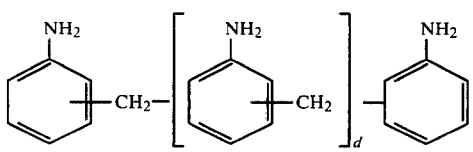

wherein d is an average value ranging from about 0.1 to about 5, preferably about 0.4. The presently preferred amines are methylene dianiline and the amine of formula (7) where d is about 0.4.

The presently preferred aromatic bismaleimide is bis(4-maleimidophenyl)methane which has the formula:

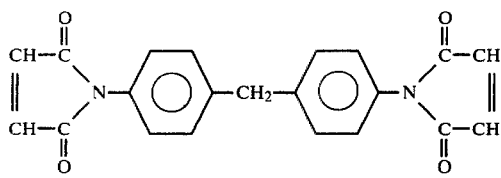

DETAILED DESCRIPTION

The invention is directed to low temperature curable compositions in which the essential ingredients are (a) at least one polyimide prepolymer which is the reaction product of an aliphatic bismaleimide, an aromatic polyamine, an aromatic bismaleimide and (b) at least one aromatic epoxy resin and/or at least one cycloaliphatic epoxy resin where the aromatic epoxy resin and the cycloaliphatic epoxy resin each contain at least two functional epoxy groups.

The compositions cure with an accelerator and preferably without an accelerator at temperatures ranging from ambient to 120° F. or more to generally inflexible end products. Cure is by reaction of epoxy groups with the hydrogen of a functional nitrogen atom. Aliphatic epoxy resins may be combined with the aromatic and/or cycloaliphatic epoxy resins to increase flexibility of the polyimide-epoxy end product. The cured polymer compositions are particularly suitable for adhesive, and coating applications requiring high adhesion to various surfaces such as to metallic and polymer coated surfaces. The cured polymer compositions offer excellent resistance to aromatic, cycloaliphatic and halogenated hydrocarbon fuels, hydraulic fluids and solvents. The compositions are particularly attractive for field repair of aircraft and missiles.

The prepolymer has as an essential ingredient at least one aliphatic bismaleimide having the formula:

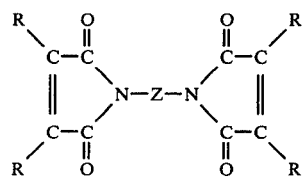

wherein Z is a polyaliphatic ether, preferably a polyaliphatic ether in which the aliphatic groups independently contain from one to about six carbon atoms and wherein each R is independently hydrogen, an aliphatic group containing one or two carbon atoms, a benzenoid radical, or a halogen. Preferably Z has a molecular weight from about 300 to about 10,000.

The presently preferred aliphatic bismaleimides are those having the formula:

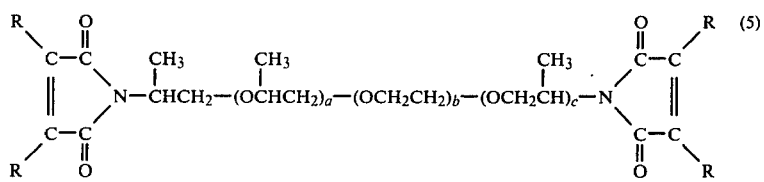

wherein the sum of a and c is about 3.5 and b is from about 13.5 to about 45.5 and R is as defined hereinabove. It is presently preferred that the sum of a and c be about 3.5 and b be about 20.5. Such bismaleimides may be formed by reacting one mole of a diamine precursor with two moles of maleic anhydride by the procedure described in U.S. Pat. No. 3,951,902 incorporated herein by reference. Other anhydrides may be used depending on the desired nature of R.

Suitable precursors are diamines manufactured and sold by Jefferson Chemical Co. under the designation "Jeffamine ED" and are available as products having average molecular weights of 600, i.e., when b equals about 13.5; 900, i.e., when b equals about 20.5; and 2000, i.e., when b equals about 45.5. Mixtures of such amines may be employed in preparing aliphatic bismaleimides and mixtures of formed bismaleimide may also be employed.

To form the polyimide prepolymer, aliphatic bismaleimides may be reacted with at least one aromatic polyamine and at least one aromatic bismaleimide by heating the components of the mix to a temperature sufficient to cause thermal reaction between the components. The thermal reaction is known as the Michael addition reaction. Reaction may occur under melt conditions with stirring. Temperatures ranging from about 100° C. to about 160° C., preferably from about 120° C. to about 150° C. may be employed.

The aromatic polyamines presently contemplated for reaction with the aliphatic and aromatic bismaleimides to form the prepolymer are compounds of the general formula:

$$NH_2—R'—NH_2 \qquad (6)$$

wherein R' is defined hereinabove and/or an aromatic polyamine having the general formula:

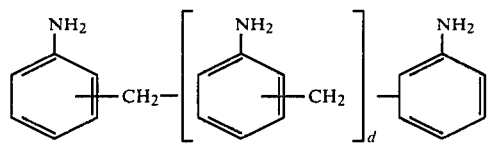

(7)

where d has an average value ranging from about 0.1 to about 5.

The presently preferred aromatic polyamines are methylene dianiline and the amine of formula (7) where d is about 0.4, such as the amine known as Jeffamine AP-22.

The aromatic bismaleimide which is used in forming the prepolymer has the general formula:

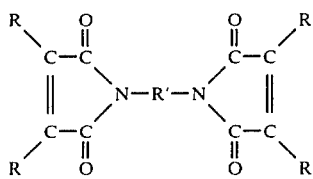

(2)

wherein R and R' are as defined hereinabove. The presently preferred aromatic bismaleimide is bis(4-maleimidophenyl)methane which has the formula:

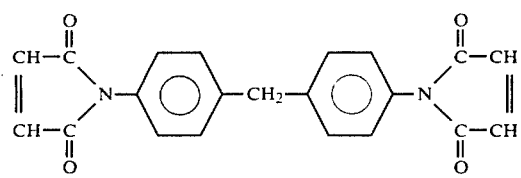

(8)

To achieve cure, a polyimide prepolymer or a mixture of such prepolymers is combined with at least one aromatic and/or cycloaliphatic di- or multifunctional epoxy resin. The epoxy resins presently contemplated to be employed are selected from the group consisting of:

(i) aromatic epoxy resins of the formula:

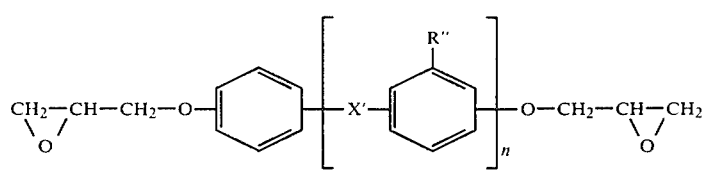

(3)

wherein n has an average value of from 0 to about 6; each X' is independently selected from the group consisting of

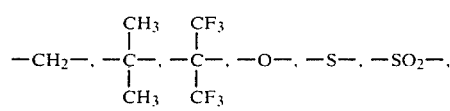

-continued $$-\underset{\underset{O}{\|}}{C}-, \quad -NH- \text{ and } -O-CH_2-\underset{\underset{OH}{|}}{CH}-CH_2-O-;$$

and each R" is independently selected from the group consisting of —H, and

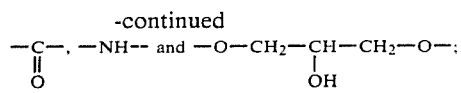

(ii) cycloaliphatic epoxy resin of the formula:

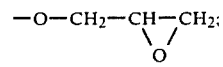

(4)

and mixtures thereof.

The preferred aromatic epoxy resins are selected from the group consisting of an epoxy resin known as ERE 1359 manufactured and sold by The Ciba-Geigy Company having the formula:

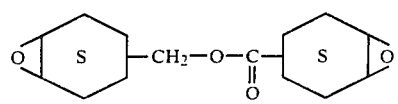

(9)

and an epoxy resin known as D.E.N. 431 manufactured and sold by the Dow Chemical Company having the formula:

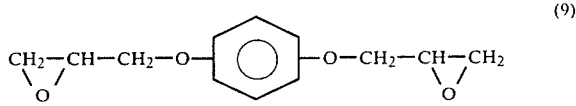

(10)

where n' has an average value of about 1.

Epoxy resins which have both aromatic and aliphatic characteristics can also be used. Illustrative of epoxy resin having aromatic and aliphatic characteristics are resins manufactured and sold by Dow Chemical Company which have the general formula:

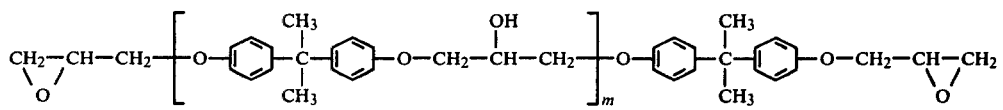

wherein m has an average value of about 1 to about 5 and wherein the viscosity varies with the value of m. Typical resins are Dow D.E.R. 321 having a viscosity from about 500 to 700 cps at 25° C.; Dow D.E.R. 331 having a viscosity from about 11,000 to about 14,000 cps at 25° C. and Dow D.E.R. 332 having a viscosity of about 4,000 to about 5,500 cps at 25° C.

The alicyclic diepoxy carboxylate is known as Araldite CY179 and is manufactured and sold by Ciba-Geigy Company.

The use of epoxy resins as crosslinking agents having aromatic and/or a cycloaliphatic structure with polyimide prepolymers as described hereinabove produces a polyimide-epoxy composition with limited flexibility. Where additional flexibility of the polyimide-epoxy composition is desired, an epoxy resin having an aliphatic structure can also be used with the polyimide prepolymer. The aliphatic epoxy resin can be used in combination with the aromatic epoxy resin, the cycloaliphatic epoxy resin or in combination with both the aromatic and cycloaliphatic epoxy resins.

The ratio of the aliphatic epoxy resin to either the aromatic epoxy resin, cycloaliphatic epoxy resin, or to the combination of aromatic and cycloaliphatic epoxy resins can be varied to impart more or less flexibility to the polyimide-epoxy composition, depending on the requirement of the finished product.

Illustrative of the aliphatic epoxy resins which may be used there may be mentioned epoxy resins of the general formula:

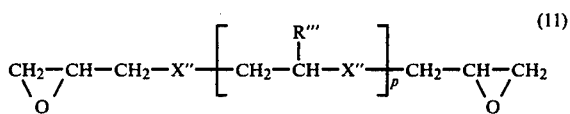

wherein each R''' is independently —H or —CH$_3$; X'' is —O—, —S—, —CH$_2$— or —CH$_2$CH$_2$—, preferably —O—, and p has an average value of about 4 to about 8 and preferably from about 6 to about 8.

Representative epoxy resins of this general formula are manufactured and sold by the Dow Chemical Company and are known as D.E.R. 732 wherein X'' is —O— and p has an average value of about 4, and as D.E.R. 736 wherein X'' is —O— and p has an average value of about 6.6.

The polyimide prepolymer is, as indicated, based on the reaction of an aliphatic bismaleimide, an aromatic polyamine and an aromatic bismaleimide. The aliphatic bismaleimide content will generally range from about 40 to about 80% by weight of the prepolymer; the aromatic polyamine content will generally range from about 10 to about 30% by weight of the prepolymer and the aromatic bismaleimide content will generally range from about 10 to about 30% by weight of the prepolymer.

Cure of the compositions of this invention is by reaction of the oxyrane ring with a primary or secondary hydrogen and may be schematically represented as follows:

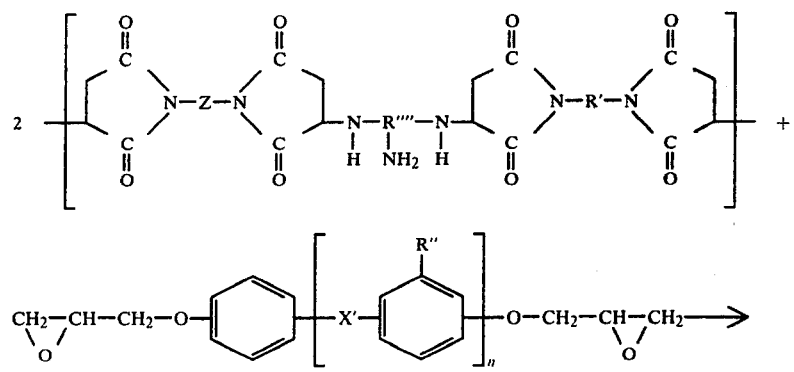

-continued

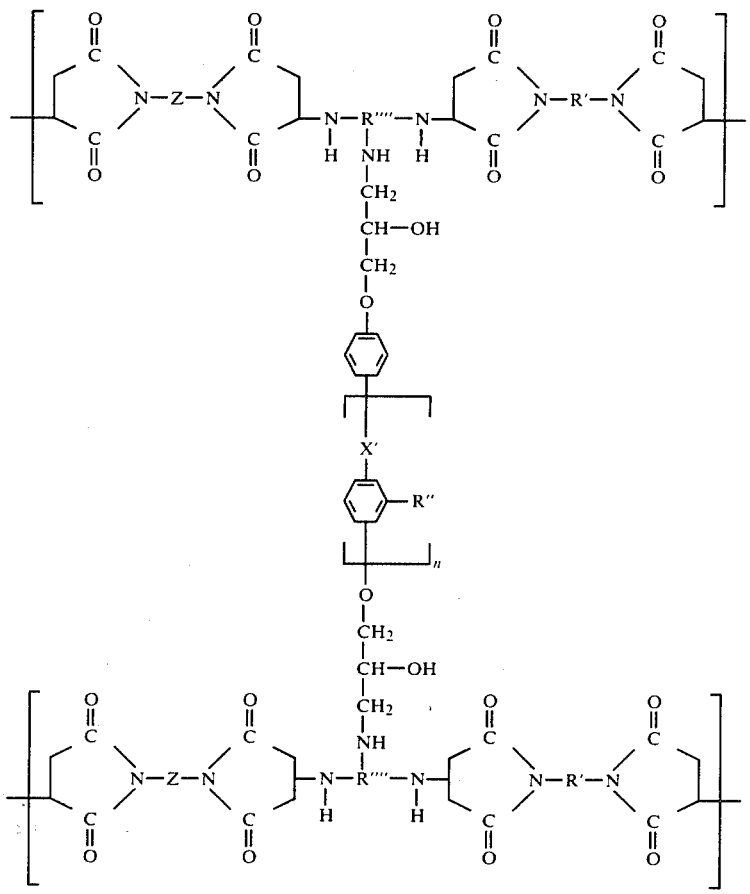

wherein Z, R', R", X', and n are as defined hereinabove and wherein R"" is the aromatic moiety of the aromatic diamine.

Curing of the prepolymer can be accomplished with the use of an accelerator and preferably, however, without the use of an accelerator. Suitable accelerators that can be used if desired include hydrogenated aromatic polyamines, ethylene diamine, diethylene triamine, triethylene tetramine, a product known as Jefferson Accelerator 398 manufactured and sold by the Jefferson Chemical Company and the like. If present, accelerators are normally provided in an amount of up to about 10 percent by weight based on the weight of the polyimide and epoxy resin.

The compositions are normally formulated to contain from about 40 to about 95% by weight, preferably about 70 to about 90% by weight polyimide prepolymer based on the total weight of the polyimide prepolymer and epoxy resin present.

While nowise limiting, the following Examples are illustrative of this invention.

EXAMPLE I

Preparation procedure of the bis (maleimide) of 900 molecular weight Jeffamine (B)

To a solution of 1350 grams (1.50 moles) of Jeffamine ED-900 in 1.5 liters of dimethylacetamide in a 5 liter round bottom flask fitted with a mechanical stirrer, dropping funnel, heating mantel, and nitrogen inlet valve, was added a solution of 326.6 grams (3.3 moles) of maleic anhydride in 1.0 liter of dimethylacetamide. The flask was cooled with an external ice bath and the maleic anhydride solution was added dropwise through a dropping funnel at a rate such as to maintain the reaction mixture temperature below 55° C. (131° F.). After a 40 minute addition period, the reaction solution was allowed to stir for an additional 60 minutes. The reaction mixture was then heated to 150° C. (302° F.) and maintained at this temperature for 24 hours. The dimethylacetamide was removed in a rotovap under reduced pressure to give 1431.0 grams (90%) of a dark red viscous liquid. The desired structure was confirmed by infrared analysis.

EXAMPLE II

Preparation of bis (4 maleimideophenyl) methane (D)

To a stirred solution of 98 parts by weight of maleic anhydride in 700 parts of chloroform was added a solution of 99 parts of methylene dianiline in 600 parts of chloroform with cooling so that the temperature was maintained at 15°-20° C. The mixture was stirred for two hours, then the bright yellow precipitate of amide acid was collected by filtration, washed well with chloroform and air dryed. The dryed amide acid was mixed with 300 parts of acetic anhydride and 20 parts of anhydrous sodium acetate. The slurry was heated to 90° C., whereupon a clear yellow solution was obtained. The heat was removed, and an exothermic reaction occurred. The stirred mixture was allowed to cool to room temperature, and then added to 800 parts of cold ethanol. The precipitated bismaleimide was collected by filtration and washed with ethanol. Recrystallization of the crude product from aqueous dioxane yielded 94 grams of nearly colorless bismaleimide, melting point 155° to 158° C.

EXAMPLE III

Synthesis of linear polyimide formulation B/F/D

In a 500 milliliter resin kettle equipped with a Cole-Parmer constant speed torque control mechanical stirrer, temperature controlled oil bath, and a nitrogen inlet valve, was placed 84.8 grams (0.08 mole) of bismaleimides of Jeffamine 900 (B) and 28.6 grams (0.08 mole) of bis (4-maleimidophenyl) methane (D). The resin kettle was purged with nitrogen gas and heated moderately at 80° C. (176° F.) with a constant sheer rate of 300 rpm for 30 minutes before adding 27.8 grams (0.14 mole) of methylenedianiline (F). This mixture was stirred at 80° C. for 5 hours to give a viscous linear polymer. The viscosity was determined to be 6000 cps at 55° C. (131° F.).

EXAMPLE IV

Synthesis of linear polyimide formulation B/G/D

In a 500 milliliter resin kettle equipped with a Cole-Parmer constant speed torque control mechanical stirrer, temperature controlled oil bath, and a nitrogen inlet valve, was placed 84.8 grams (0.08 mole) of bismaleimides of Jeffamine 900 (B) and 28.6 grams (0.08 mole) of bis (4 maleimidophenyl) methane (D). The resin kettle was purged with nitrogen gas and heated moderately at 80° C. (176° F.) with a constant stir rate of 300 rpm for 30 minutes before adding 31.0 grams, 0.14 mole of Jeffamine AP-22 (G). This mixture was stirred at 80° C. for 5 hours to give a viscous linear polymer.

EXAMPLE V

Curing of flexible polyimide blend B/G/D with epoxy resin D.E.N. 431

Eighteen grams of a flexible polyimide prepared by melting and stirring 84.4 g (0.08 mole) of the bismaleimide of Jeffamine 900 (B), 28.6 g (0.08 mole) of bis (4-maleimidophenyl) methane (D), and 37.3 g (0.16 mole) of Jeffamine AP-22 (G) in a 200 ml resin kettle at 80° C. (177° F.) for 4 hours, was added to 32.0 g of epoxy resin D.E.N. 431. With reference to page 12 D.E.N. 431 is an aromatic epoxy resin having the formula (10). The mixture was warmed to 50° C. (122° F.) and then blended by manual stirring to give a homogeous mass. Upon standing at ambient temperature for 48 hours, the resin system cured to a tack free state. The addition of 3% by weight of Jeffamine 398 accelerator to a separate sample induced the polyimide/epoxy to cure in 30 hours to a tack free state.

EXAMPLE VI

Cure tests were run on several polyimide-epoxy blends (B/G/D/epoxy) and the results are shown in Table I. The samples of the polyimide prepolymer B/G/D were subjected to cure studies at room temperature using about 1% by weight Jefferson 398 accelerator based on the epoxy present. Jefferson 398 Accelerator is manufactured and sold by the Jefferson Chemical Company. The cure studies were conducted in aluminum cups and reactions were monitored by Shore A hardness.

EXAMPLE VII

Polyimide-epoxy blends using the polyimide prepolymer formulation B/G/D with the epoxy resin D.E.R. 331 manufactured and sold by the Dow Chemical Company were formulated.

The compositions were 80% B/G/D and 20% D.E.R. 331; 70% B/G/D and 30% D.E.R. 331; and 60% B/G/D and 40% D.E.R. 331. The hardness characteristics of the products at select periods of time are shown in Table II.

TABLE I

SHORE A HARDNESS OF E-G-D/EPOXY BLENDS AFTER FIVE DAYS AT RCOM TEMPERATURE

| Epoxy | Percent by Weight of Epoxy in Blend | | |
|---|---|---|---|
| | 10 | 20 | 30 |
| ERE-1359 | 5 | 50 | 80 |
| DEN-431 | 35 | 60 | 70 |

TABLE II

| FPI/EPOXY Blend | Shore A Hardness (7 Days at R.T.)[a] | Shore A Hardness After Aging at 200° F. In Air - 1 Day |
|---|---|---|
| B/G/D:331 (80/20) | 25–28 | 90–97 |
| (70/30) | 63–67 | 99–99 |
| (60/40) | 68–65 | 99–99 |

[a]Reading on duplicate samples

What is claimed is:

1. A low temperature curable composition comprising:
   (a) at least one curable polyimide prepolymer formed at a temperature sufficient to cause thermal reaction between heated components of a mixture of:
      (i) at least one aliphatic bismaleimide of the formula:

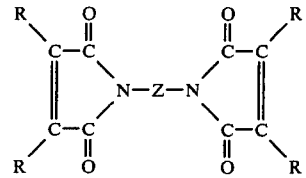

wherein Z is a polyaliphatic ether in which each aliphatic group individually contains from one to about six carbon atoms, and in which each R is independently selected from the group consisting of hydrogen, an aliphatic group containing one or two carbon atoms, a benzenoid radical and a halogen;
      (ii) at least one aromatic polyamine; and
      (iii) at least one aromatic bismaleimide of the formula:

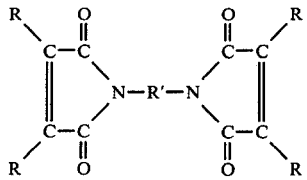

wherein each R is independently selected from the group consisting of hydrogen, an aliphatic group containing one or two carbon atoms, a benzenoid radical and a halogen and wherein R' is a bifunctional benzenoid radical selected from the group consisting of:

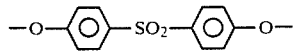

wherein X is selected from the group consisting of: —O—, —S—, —SO₂—, —CH₂—, —C₂H₄—, —CO—, —C₃H₆—, and

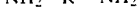

and;

(b) at least one aromatic epoxy resin of the formula:

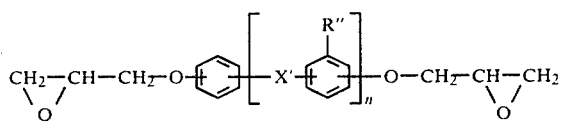

wherein n has an average value of from 0 to about 6; each X' is independently selected from the group consisting of:

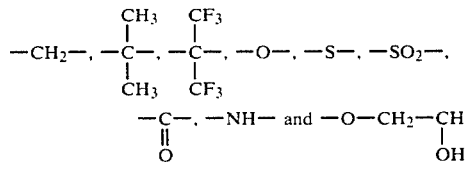

and each R" is independently selected from the group consisting of —H, and

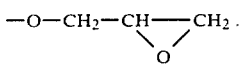

2. A composition as claimed in claim 1 in which the aliphatic bismaleimide is of the formula:

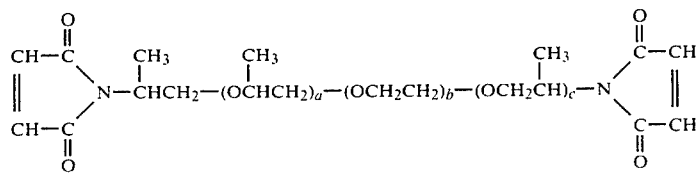

where the sum of a and c is equal to about 3.5 and b is equal to about 13.5 to about 45.5.

3. A composition as claimed in claim 1 in which the aliphatic bismaleimide is of the formula:

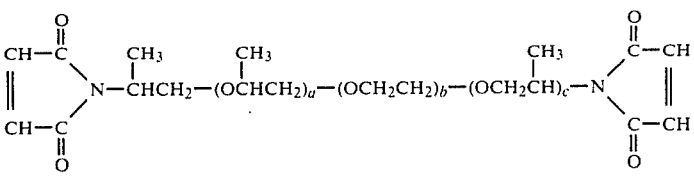

where the sum of a and c is equal to about 3.5 and b is equal to about 20.5.

4. A composition as claimed in claim 1 in which the aromatic polyamine is selected from the group consisting of amines of the formula:

$$NH_2—R'—NH_2$$

wherein R' is a bifunctional benzenoid radical selected from the group consisting of:

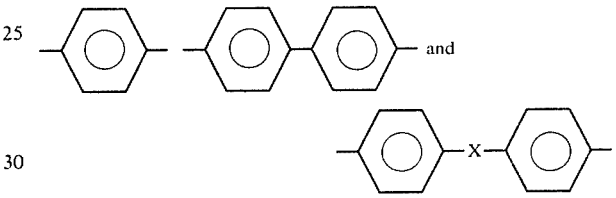

wherein X is selected from the group consisting of: —O—, —S—, —SO₂—, —CH₂—, —C₂H₄—, —CO—, —C₃H₆—, and

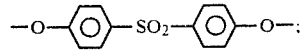

amines of the formula:

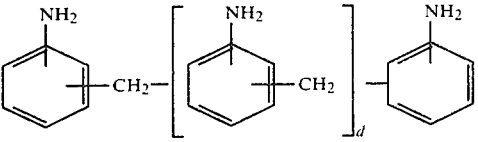

wherein d has a value from 0 to about 5, and mixtures thereof.

5. A composition as claimed in claim 1 in which the aromatic polyamine is selected from the group consisting of methylenedianiline, an amine of the formula:

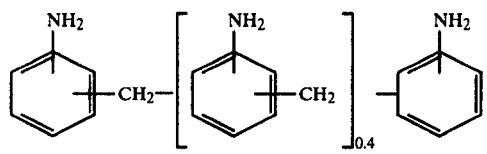

and mixtures thereof.

6. A composition as claimed in claim 1 in which the aromatic bismaleimide has the formula:

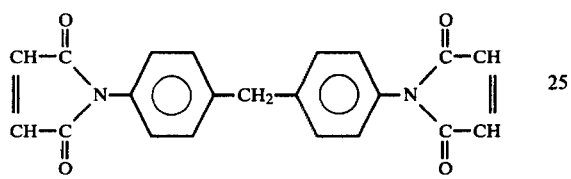

7. A composition as claimed in claim 1 in which the epoxy resin has the formula:

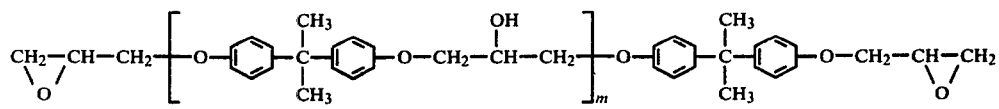

wherein m has an average value of from 1 to about 5.

8. A composition as claimed in claim 7 in which the epoxy resin has a viscosity of from about 11,000 to about 14,000 cps at 25° C.

9. A composition as claimed in claim 1 in which the epoxy resin is of the formula:

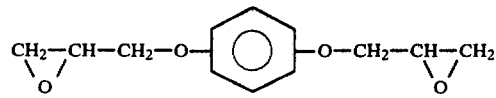

10. A composition as claimed in claim 1 in which the epoxy resin is of the formula:

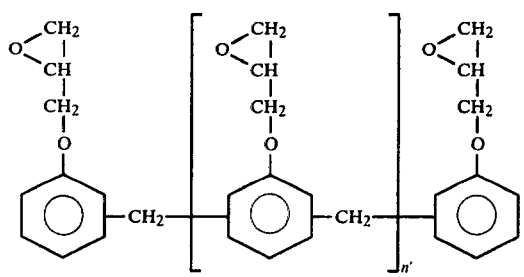

wherein n' has an average value of about 1.

11. A low temperature curable composition comprising:
(a) at least one curable polyimide prepolymer formed at a temperature sufficient to cause thermal reaction between heated components of a mixture of:
(i) at least one aliphatic bismaleimide of the formula:

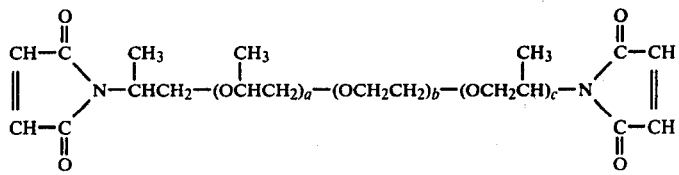

where the sum of a and c is equal to about 3.5 and b is equal to about 13.5 to about 45.5; and
(ii) an aromatic polyamine selected from the group consisting of methylene dianiline, an amine of the formula:

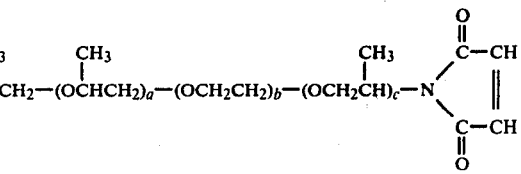

wherein d has a value of from 0 to about 5 and mixtures thereof.

(iii) an aromatic bismaleimide of the formula:

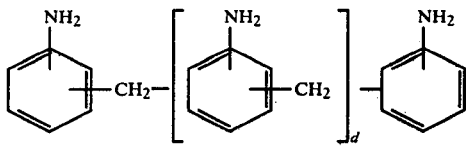

; and (b) at least one aromatic epoxy resin of the formula:

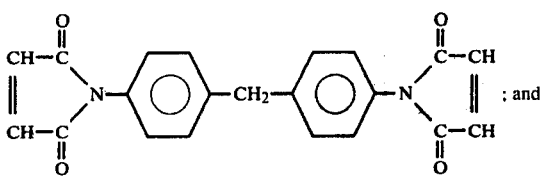

wherein n has an average value of from 0 to about 6; each X' is independently selected from the group consisting of:

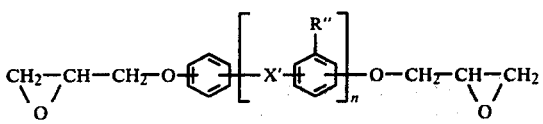

and each R'' is independently selected from the group consisting of —H, and

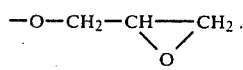

12. A composition as claimed in claim 11 where the aliphatic bismaleimide has the general formula:

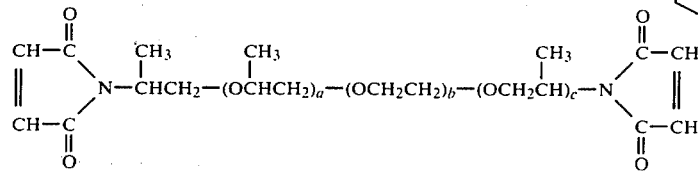

and the sum of a and c is equal to about 3.5 and b is equal to about 20.5.

13. A composition as claimed in claim 11 in which the aromatic polyamine is an amine of the formula:

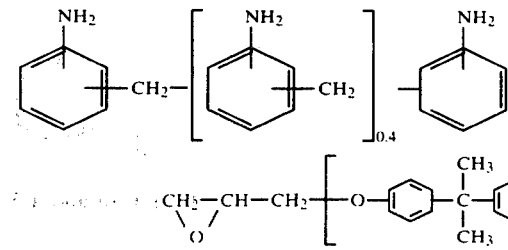

14. A composition as claimed in claim 11 in which the epoxy resin has the formula:

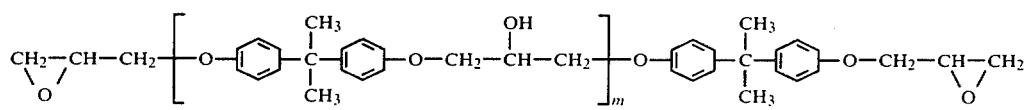

wherein m has an average value of from 1 to about 5.

15. A composition as claimed in claim 14 in which the epoxy resin has a viscosity from about 11,000 to about 14,000 cps at 25° C.

16. A composition as claimed in claim 11 in which the epoxy resin is of the formula:

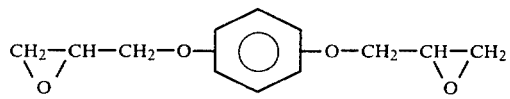

17. A composition as claimed in claim 11 in which the epoxy resin is of the formula:

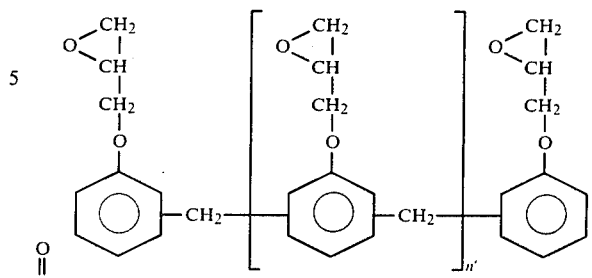

wherein n' has an average value of about 1.

18. A composition as claimed in claim 12 in which the epxoy resin has the formula:

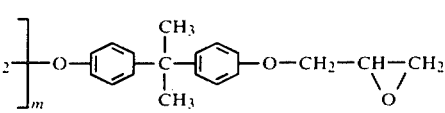

wherein m has an average value of from 1 to about 5.

19. A composition as claimed in claim 18 in which the epoxy resin has a viscosity of from about 11,000 to about 14,000 cps at 25° C.

20. A composition as claimed in claim 12 in which the epoxy resin is of the formula:

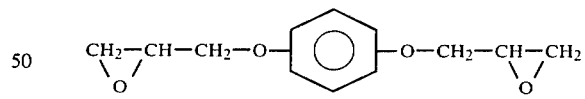

21. A composition as claimed in claim 12 in which the epoxy resin is of the formula:

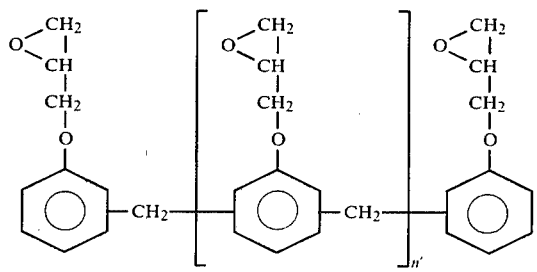

wherein n' has an average value of about 1.

22. A composition as claimed in claim 13 in which the epoxy resin has the formula:

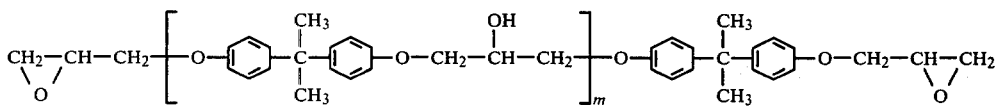

wherein m has an average value of from 1 to about 5.

23. A composition as claimed in claim 22 in which the epoxy resin has a viscosity of from about 11,000 to about 14,000 cps at 25° C.

24. A composition as claimed in claim 13 in which the epoxy resin is of the formula:

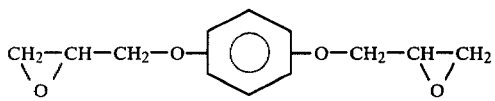

25. A composition as claimed in claim 13 in which the epoxy resin is of the formula:

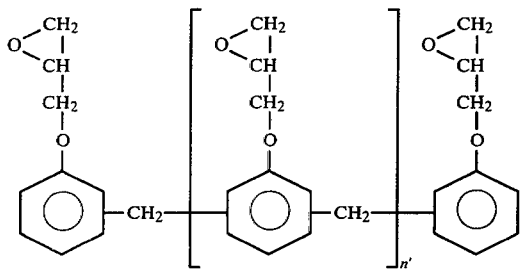

wherein n' has an average value of about 1.

26. A low temperature curable composition comprising:
(a) at least one curable polyimide prepolymer formed at a temperature sufficient to cause thermal reaction between heated components of a mixture of:
(i) at least one aliphatic bismaleimide of the formula:

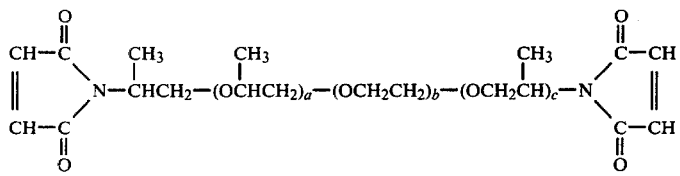

where the sum of a and c is equal to about 3.5 and b is equal to about 20.5;
(ii) methylene dianaline;
(iii) an aromatic bismaleimide of the formula:

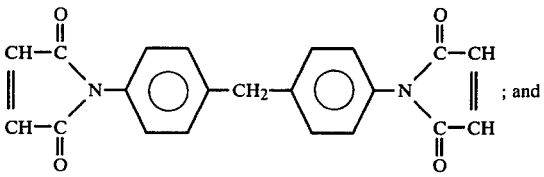

(b) at least one aromatic epoxy resin of the formula:

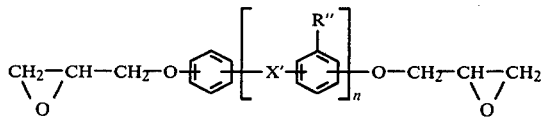

wherein n has an average value of from 0 to about 6; each X' is independently selected from the group consisting of:

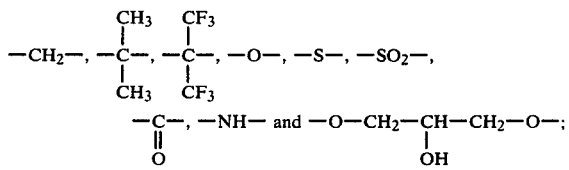

and each R'' is independently selected from the group consisting of —H, and

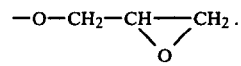

27. A composition as claimed in claim 26 in which the epoxy resin has the formula:

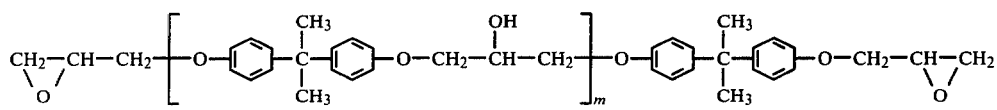

wherein m has an average value of from 1 to about 5.

28. A composition as claimed in claim 27 in which the epoxy resin has a viscosity of from about 11,000 to about 14,000 cps at 25° C.

29. A composition as claimed in claim 26 in which the epoxy resin is of the formula:

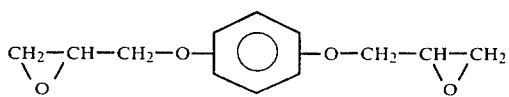

30. A composition as claimed in claim 26 in which the epoxy resin is of the formula:

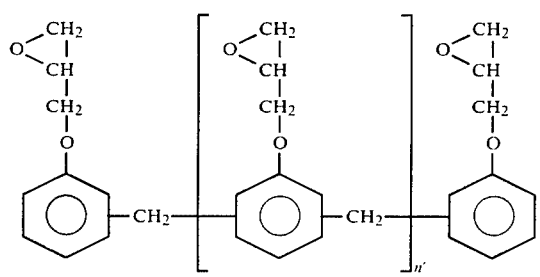

wherein n' has an average value of about 1.

31. A low temperature curable composition comprising:
(a) at least one curable polyimide prepolymer formed at a temperature sufficient to cause thermal reaction between heated components of a mixture of:
(i) at least one aliphatic bismaleimide of the formula:

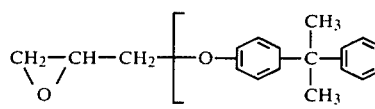

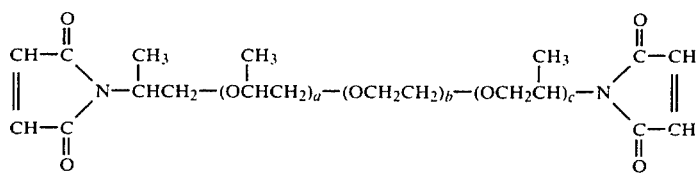

where the sum of a and c is equal to about 3.5 and b is equal to about 20.5; and
(ii) an aromatic polyamine of the formula:

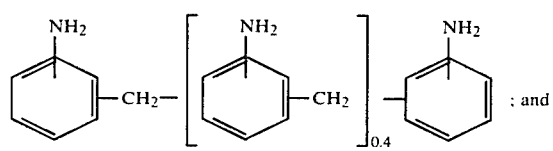

(iii) an aromatic bismaleimide of the formula:

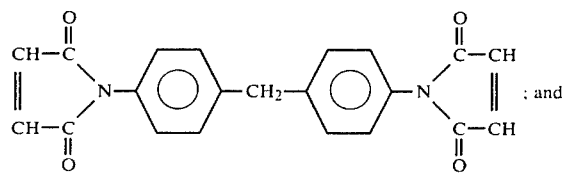

(b) at least one aromatic epoxy resin of the formula:

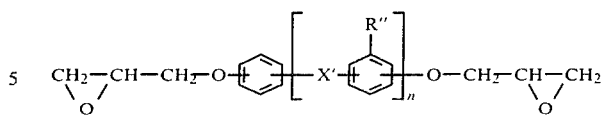

wherein n has an average value of from 0 to about 6; each X' is independently selected from the group consisting of:

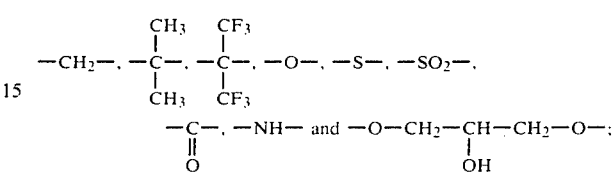

and each R" is independently selected from the group consisting of —H, and

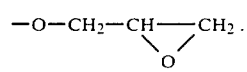

32. A composition as claimed in claim 31 in which the epoxy resin has the formula:

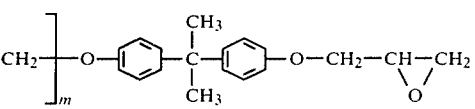

wherein m has an average value of from 1 to about 5.

33. A composition as claimed in claim 32 in which the

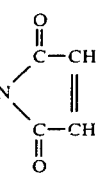

epoxy resin has a viscosity of from about 11,000 to about 14,000 cps at 25° C.

34. A composition as claimed in claim 31 in which the epoxy resin is of the formula:

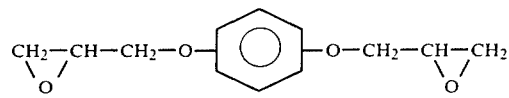

35. A composition as claimed in claim 31 in which the epoxy resin is of the formula:

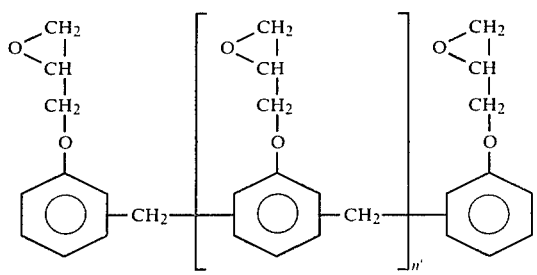

wherein n' has an average value of about 1.

* * * * *